(12) United States Patent
Wang et al.

(10) Patent No.: US 10,020,676 B2
(45) Date of Patent: Jul. 10, 2018

(54) WATCHDOG CIRCUIT

(71) Applicant: NXP B.V., Eindhoven (NL)

(72) Inventors: Ge Wang, Chandler, AZ (US); Harold Garth Hanson, Queen Creek, AZ (US)

(73) Assignee: NXP B.V., Eindhoven (NL)

(*) Notice: Subject to any disclaimer, the term of this patent is extended or adjusted under 35 U.S.C. 154(b) by 190 days.

(21) Appl. No.: 15/082,025

(22) Filed: Mar. 28, 2016

(65) Prior Publication Data

US 2017/0279299 A1 Sep. 28, 2017

(51) Int. Cl.
*H02J 7/00* (2006.01)
*H02J 9/00* (2006.01)
*H02J 9/06* (2006.01)
*G06F 11/07* (2006.01)
*G06F 1/24* (2006.01)

(52) U.S. Cl.
CPC ............... *H02J 9/061* (2013.01); *G06F 1/24* (2013.01); *G06F 11/0736* (2013.01); *G06F 11/0745* (2013.01); *G06F 11/0757* (2013.01); *G06F 11/0793* (2013.01)

(58) Field of Classification Search
USPC ...................................................... 307/64, 24
See application file for complete search history.

(56) References Cited

U.S. PATENT DOCUMENTS

| 4,181,842 | A | | 1/1980 | Elias et al. | |
|---|---|---|---|---|---|
| 4,271,444 | A | * | 6/1981 | Howell | H02H 1/0069 361/48 |
| 5,704,038 | A | * | 12/1997 | Mueller | G06F 11/0757 714/55 |
| 6,169,428 | B1 | * | 1/2001 | Mader | G01R 19/0084 327/101 |
| 7,126,310 | B1 | * | 10/2006 | Barron | H02J 7/0016 320/108 |
| 7,709,977 | B2 | | 5/2010 | Jansen et al. | |
| 7,825,793 | B1 | * | 11/2010 | Spillman | G08B 25/009 340/507 |
| 2003/0075211 | A1 | * | 4/2003 | Makita | F24J 2/5237 136/244 |
| 2004/0001292 | A1 | * | 1/2004 | Vanderkolk | H02H 3/33 361/42 |
| 2006/0058977 | A1 | * | 3/2006 | Zhu | B60C 23/061 702/148 |
| 2008/0066119 | A1 | | 3/2008 | Schieltz et al. | |
| 2009/0091868 | A1 | * | 4/2009 | Trenchs | B60L 3/0046 361/42 |
| 2010/0207635 | A1 | * | 8/2010 | Plagens | B60L 3/0023 324/509 |
| 2010/0292945 | A1 | * | 11/2010 | Reynolds | G06F 3/044 702/65 |
| 2010/0293395 | A1 | | 11/2010 | Li et al. | |

(Continued)

FOREIGN PATENT DOCUMENTS

WO WO-03/029909 A1 4/2003

*Primary Examiner* — Adam Houston

(57) ABSTRACT

One example discloses a watchdog circuit: wherein the watchdog circuit is configured to receive a primary ground from a primary power supply, and a backup ground from a backup power supply; wherein the watchdog circuit includes a ground switch coupled to the primary ground and the backup ground; and wherein the ground switch is configured to isolate the primary ground from the backup ground in response to a fault signal.

17 Claims, 4 Drawing Sheets

(56) References Cited

U.S. PATENT DOCUMENTS

| | | | |
|---|---|---|---|
| 2012/0281444 A1* | 11/2012 | Dent | H02M 7/53871 |
| | | | 363/56.01 |
| 2012/0326504 A1* | 12/2012 | Ballantine | H02J 3/006 |
| | | | 307/24 |
| 2013/0193766 A1* | 8/2013 | Irwin | H02H 7/268 |
| | | | 307/82 |
| 2013/0307556 A1* | 11/2013 | Ledenev | G01R 31/025 |
| | | | 324/509 |
| 2014/0277802 A1* | 9/2014 | Tomas | G06F 1/30 |
| | | | 700/292 |
| 2015/0046115 A1 | 2/2015 | Shimono et al. | |
| 2015/0333637 A1* | 11/2015 | Izumi | H02M 1/32 |
| | | | 363/21.01 |
| 2016/0006297 A1* | 1/2016 | Lee | H02J 9/061 |
| | | | 307/64 |
| 2016/0094086 A1* | 3/2016 | Lee | H02J 9/061 |
| | | | 307/20 |
| 2016/0270174 A1* | 9/2016 | Rimmer | H05B 33/0803 |
| 2017/0070149 A1* | 3/2017 | Guan | H02M 3/158 |
| 2017/0279299 A1* | 9/2017 | Wang | H02J 9/061 |
| 2017/0317500 A1* | 11/2017 | Kumar | H02J 3/383 |
| 2017/0331276 A1* | 11/2017 | McMahon | H02H 3/335 |
| 2017/0331293 A1* | 11/2017 | Narla | H02J 3/383 |

* cited by examiner

WATCHDOG CIRCUIT

The present specification relates to systems, methods, apparatuses, devices, articles of manufacture and instructions for a watchdog circuit.

SUMMARY

According to an example embodiment, a watchdog circuit: wherein the watchdog circuit is configured to receive a primary ground from a primary power supply, and a backup ground from a backup power supply; wherein the watchdog circuit includes a ground switch coupled to the primary ground and the backup ground; and wherein the ground switch is configured to isolate the primary ground from the backup ground in response to a fault signal.

In another example embodiment, wherein, in response to the fault signal, the ground switch is powered by the backup power supply and not the primary power supply.

In another example embodiment, wherein the fault signal is at least one of: a system power outage signal, a circuit malfunction signal, a computer malfunction signal, an error state signal, or a sensor signal.

In another example embodiment, wherein the watchdog circuit, in response to the fault signal, is configured to transmit at least one of: a reset hardware signal, a reboot software signal, a place system in a safe state signal, or a supply emergency power to selected circuits signal.

In another example embodiment, further comprising a set of logic circuitry having a common ground which is coupled to a reset switch input; wherein the reset switch input is configured to route the primary ground to the common ground of the set of logic circuitry when the fault signal is absent; and wherein the reset switch input is configured to route a backup voltage from the backup power supply to the common ground of the set of logic circuitry when the fault signal is present.

In another example embodiment, wherein the logic circuitry is configured to operate normally when receiving the primary ground; and wherein the logic circuitry is configured to reset when receiving the backup voltage.

In another example embodiment, further comprising a reset switch, coupled to the reset switch input and the watchdog circuit; wherein the watchdog circuit is configured to generate a reset signal in response to the fault signal; wherein the reset switch is configured to receive the reset signal and couple the primary ground to the logic circuitry when the reset signal is absent; and wherein the reset switch is configured to couple the backup voltage to the logic circuitry when the reset signal is present.

In another example embodiment, wherein the backup power supply is at least one of: a charge storage device, a storage capacitor, or a battery.

In another example embodiment, wherein the watchdog circuit is configured to receive a keep-alive signal; and wherein the watchdog circuit is configured to equate absence of the keep-alive signal as equivalent to the fault signal.

In another example embodiment, wherein the watchdog circuit includes a timer; wherein the timer is configured to determine a time since a last keep-alive signal was received; and wherein the watchdog circuit is configured to equate absence of the keep-alive signal as equivalent to the fault signal, when the time since the last keep-alive signal was received exceeds a preset threshold time.

In another example embodiment, wherein the watchdog circuit is embedded within a system interface chip configured to transfer data received from a USB interface to internal circuits within an electronic device.

In another example embodiment, wherein the watchdog circuit is embedded in at least one of: a cell phone, a smartphone, a wearable, an internet of things device, a microcontroller, an automotive system controller, or a vehicle to vehicle interface device.

According to an example embodiment, an article of manufacture including at least one non-transitory, tangible machine readable storage medium containing executable machine instructions for operating a watchdog circuit, comprising: wherein the article includes a ground switch coupled to a primary ground from a primary power supply, and a backup ground from a backup power supply; and wherein the instructions include isolating the primary ground from the backup ground in response to a fault signal.

In another example embodiment, wherein the instructions include: transmitting in response to the fault signal at least one of: a reset hardware signal, a reboot software signal, a place system in a safe state signal, or a supply emergency power to selected circuits signal.

In another example embodiment, wherein the article includes a set of logic circuitry having a common ground; and wherein the instructions includes: coupling the primary ground to the common ground of the set of logic circuitry when the fault signal is absent; and coupling a backup voltage from the backup power supply to the common ground of the set of logic circuitry when the fault signal is present.

In another example embodiment, wherein the instructions include: receiving a keep-alive signal; and equating an absence of the keep-alive signal as equivalent to the fault signal.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings, in which:

Figure 1:
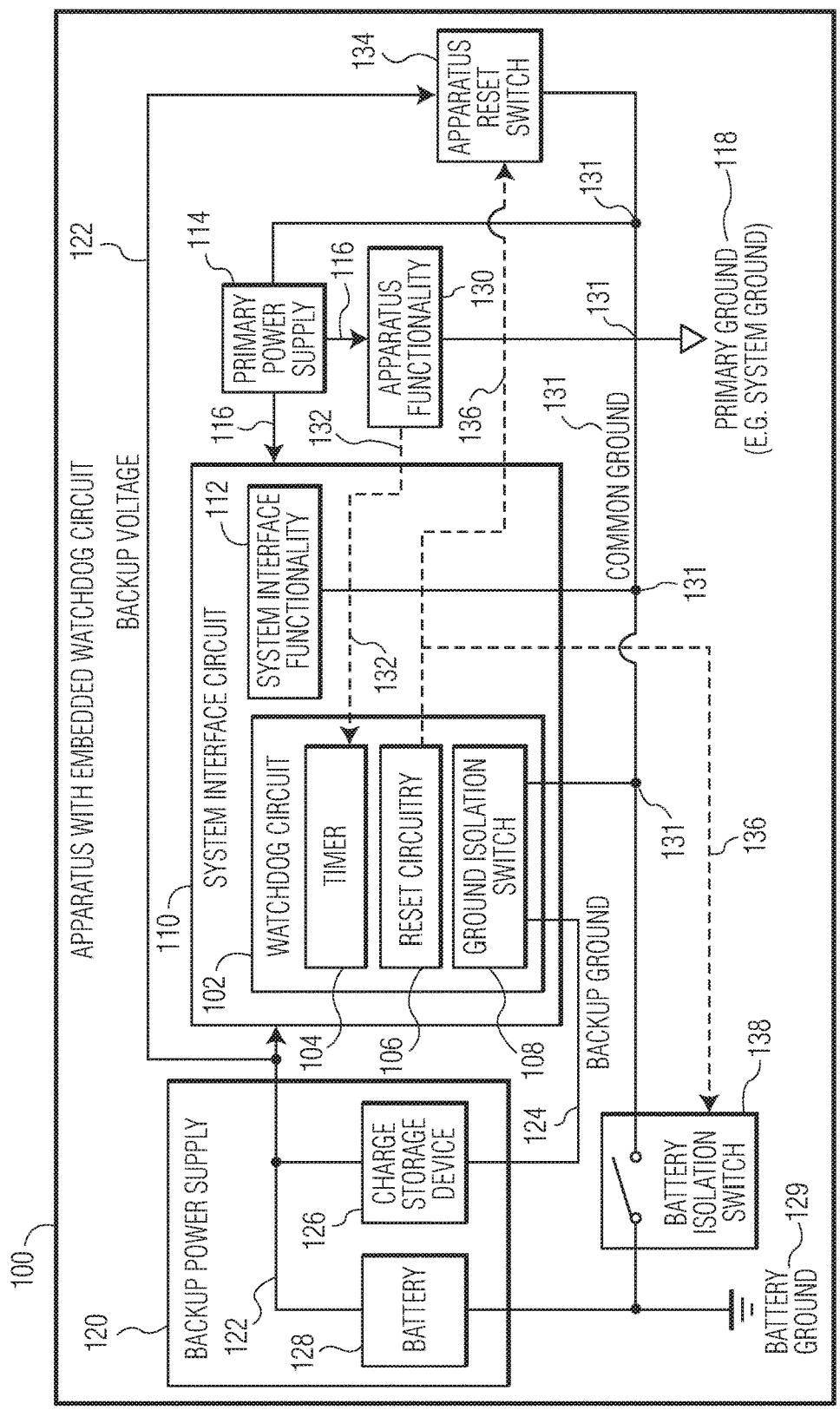
FIG. 1 is a first example of apparatus with an embedded watchdog circuit.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

In some example circuits, watchdog functionality includes a timer that is used to detect and initiate software and/or hardware recovery routines in response to circuit and/or computer malfunctions.

In an example system where during nominal operations, the system may regularly restart the watchdog timer to prevent it from "timing out". Failure of the system to restart the watchdog timer could be due to a system software and/or hardware fault (e.g. system power outage in a cell phone).

The watchdog functionality detects the lack of the restart command and is programmed to generate alarms, initiate corrective action, and other functionality, which may include: resetting the hardware, rebooting the software, placing the system in a safe state, and/or providing emergency power to selected circuits.

FIG. 1 is a first example of apparatus 100 with an embedded watchdog circuit 102. The watchdog circuit 102 includes a timer 104, reset circuitry 106 and a ground isolation switch 108. The watchdog circuit 102 resides in a system interface circuit 110 having system interface functionality 112.

The apparatus 100 includes a primary power supply 114, configured to output a primary voltage 116 and coupled to a primary ground 118 (e.g. a system ground). During operation of the apparatus 100, the primary ground 118 can either be connected to 0 Volts or left floating. The apparatus 100 also includes a backup power supply 120 configured to output a backup voltage 122 and coupled to a backup ground 124 of a charge storage device 126. The charge storage device 126 is in a backup power supply 120 which may also include a battery 128 having a battery ground 129.

Apparatus functionality 130 (e.g. apparatus 100 logic circuits, software, etc.) connected to a common ground 131 is configured to output a fault signal 132 to the watchdog circuit 102, and is coupled to receive the primary voltage 116 from the primary power supply 114. The common ground 131 of the apparatus functionality 130 is also coupled to receive either 0 Volts from the primary ground 118 or the backup voltage 122 from an apparatus reset switch 134.

The apparatus reset switch 134 is coupled to receive a reset signal 136 from the watchdog circuit 102. The reset signal 136 determines whether the apparatus reset switch 134 routes the backup voltage 122 to the primary ground 118, or not. Also, a battery isolation switch 138 is coupled to receive the reset signal 136 from the watchdog circuit 102. The reset signal 136 determines whether the battery isolation switch 138 isolates the primary ground 118 from the backup ground 124, or not.

The watchdog circuit 102 ground switch 108 is configured to receive the primary ground 118 from the primary power supply 114, and connect to the backup ground 124 on one end of the charge storage device 126. The ground switch 108 is configured to isolate the primary ground 118 from the charge storage device 126 in response to the fault signal 132. As a result, the watchdog circuit 102 functions can still keep working even though the apparatus's 100 primary power supply 114 and/or other functionality is lost and is going through a reset process.

When the fault signal 132 is present, the ground switch 108 is powered by the charge storage device 126 in the backup power supply 120 and not the primary power supply 114.

The fault signal 132 can be generated in response to a wide range of apparatus 100 conditions, including: a system power outage, a circuit malfunction, a computer malfunction, an error state, or a sensor limit that has been exceeded. When the fault signal 132 has been transmitted, the battery isolation switch 138 isolates the primary ground 118 from the backup ground 124, and the apparatus reset switch 134 applies the backup voltage 122 to the common ground 131 so as to reset the apparatus's 100 circuits.

In one example, the fault signal 132 is actually a keep-alive signal, and the watchdog circuit 102 is configured to equate absence of the keep-alive signal as equivalent to a fault condition. In this example, the watchdog circuit 102 includes a timer configured to determine a time since a last keep-alive signal was received, and the watchdog circuit 102 is configured to equate absence of the keep-alive signal as equivalent to the fault signal, when the time since the last keep-alive signal was received exceeds a preset threshold time.

In response to the fault signal 132, the watchdog circuit 102 is configured to transmit various application specific commands to the apparatus 100, perhaps including: a reset hardware command, a reboot software command, a place system in a safe state command, or a supply emergency power to selected circuits command.

As previously mentioned, the watchdog circuit 102 in this example embodiment is included in the system interface circuit 110 having system interface functionality 112 (e.g. a set of logic circuitry, software, etc.) and the apparatus 100 similarly has its own apparatus functionality 130 (e.g. logic circuits, software, etc.).

In one example, the system interface circuit 110 is configured to transfer data received from a USB interface to internal circuits within an electronic device. In other example embodiments, the watchdog circuit 102 is instead embedded by itself in at least one of: a cell phone, a smartphone, a wearable, an internet of things device, a microcontroller, an automotive system controller, or a vehicle to vehicle interface device.

These functionalities 112, 130 are coupled to the common ground 131 which is then connected to the reset switch 134. The reset switch 134 does not route the backup voltage 122 routes to these functionalities 112, 130 when the fault signal is absent. However the reset switch 134 does route the backup voltage 122 to these functionalities 112, 130 when the fault signal is present.

Thus during normal operation, the apparatus reset switch 134 is open, and battery isolation switch 138 is closed. In this state, 0 Volts from the primary ground 118 is routed to the common ground 131.

During a fault condition, the apparatus reset switch 134 is closed, and the battery isolation switch 138 is open. In this state, the backup voltage 122 from the reset switch 134 is routed to the common ground 131.

The functionalities 112, 130 are configured to operate nominally when receiving the primary ground 118, and to reset when receiving the backup voltage 122.

The backup power supply 120 can in various embodiments be: a charge storage device, a storage capacitor, or a battery.

Figure 2:
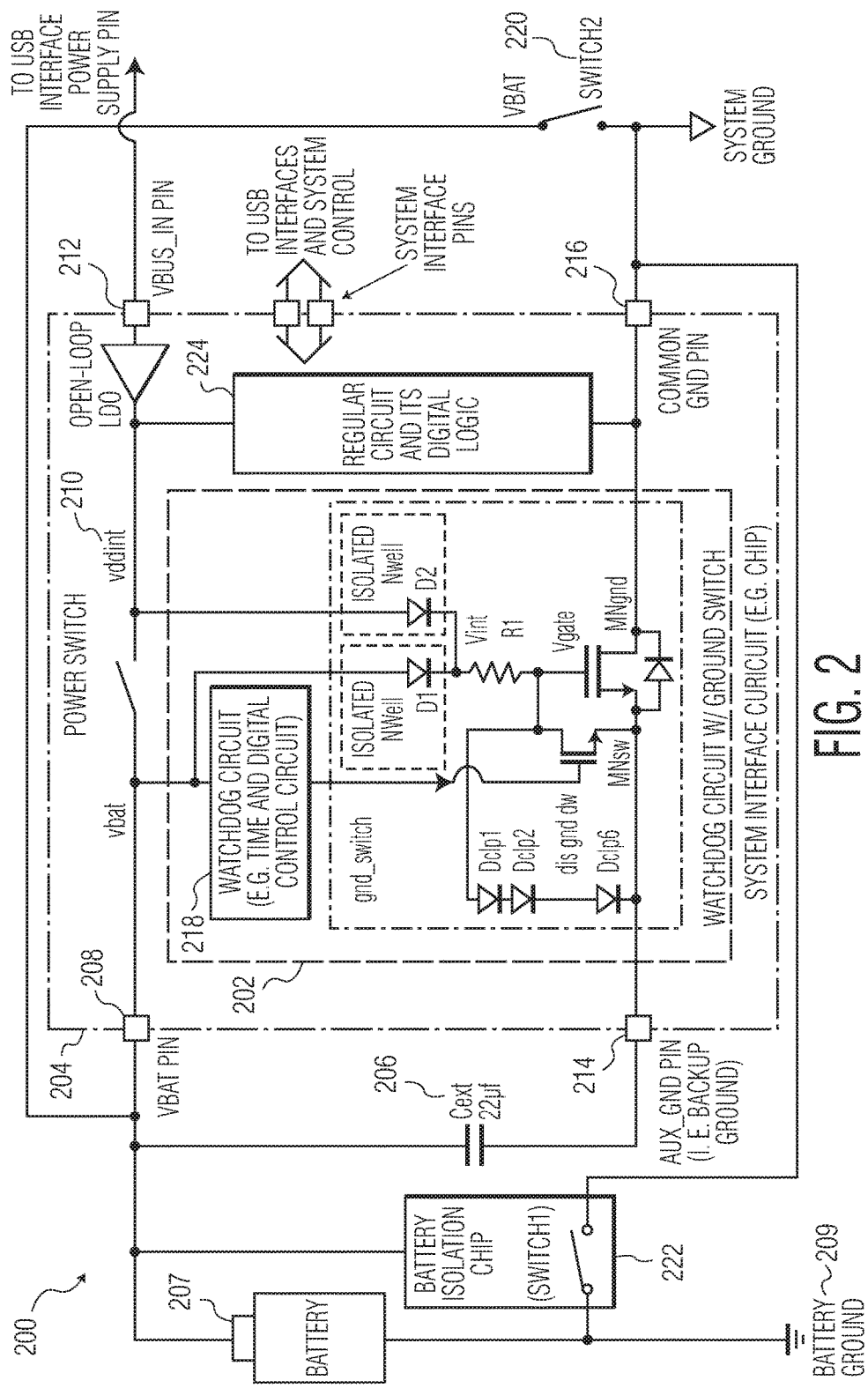
FIG. 2 is a second example apparatus with an embedded watchdog circuit.

FIG. 2 is a second example apparatus 200 with an embedded watchdog circuit 202. In the second example apparatus 200, the watchdog circuit 202 is embedded in a system interface chip 204 configured to transfer data received from a USB interface (not shown) to internal circuits within the second apparatus 200 (e.g. a cell phone).

The second example apparatus 200 includes power from a primary/system power source received at VBUS_IN 212 and from a backup power supply, including Cext 206 and an optional battery 207, both connected to VBAT input 208. In one example embodiment, the "power switch", shown in the system interface chip 204, is used to charge Cext 206 from VBUS_IN 212, but not from the battery 207.

In the shaded area 202, D1 and D2 are two isolated diodes whose positive nodes are connected to the VBAT input 208, and an internal on-chip power supply node 210 (e.g. vddint), respectively. D1 and D2 perform an analog OR function to let node 'Vint' (inside the watchdog circuit 202) to be at the higher voltage of VBAT or vddint minus a diode voltage drop. Resistor R1 is set to be large enough to reduce the current through the resistor.

The diode chain Dclp1 through Dclp6 (inside the watchdog circuit 202) are used to softly clamp the voltage at node Vgate. Such a clamp configuration limits the highest voltage of the clamped node. When the Vgate voltage is high, causing MNgnd to be turned on, there is some current flowing via from Dclp1 through Dclp6. In this condition, system power, received at VBUS_IN 212, is still available and some small current is flowing through the clamping diodes.

When the system power, received at VBUS_IN 212, is not available or in response to a fault condition in the second example apparatus 200, a watchdog timer 218 turns on MNsw (e.g. an NMOS device), causing the Vgate voltage to be pulled down to low, and thus turning off MNgnd. When MNgnd is turned off, the backup power supply ground (i.e. AUX_GND 214 connected to Cext 206) is separated from the System Ground, GND 216.

In this condition, there is zero current via the clamping diodes because Vgate is pulled to low. Zero current is acceptable since the watchdog function relies on the backup power supply from Cext 206, and minimizing current drain from Cext 206 is beneficial.

In the watchdog circuit 202, the ground switch MNgnd is controlled by control switch MNsw via digital signal "Dis_gnd_sw" from the watchdog timer 218. When Dis_gnd_sw=high, the MNsw is turned on, Vgate is pulled down to AUX_GND node, and MNgnd is turned off. When Dis_gnd_sw=low, the MNsw is turned off, Vgate stays at high voltage, and MNgnd turned on.

When there is no fault condition, switch-2 220 is open, and switch-1 222 is closed. In this state the system ground is connected to 0V and the battery's 207 separate ground is connected to the system ground.

When there is a fault condition, switch-2 220 is closed, and switch-1 222 is open. In this state the system ground is left floating and is connected to VBAT from Cext 206. This resets circuitry in the second apparatus 200 and in the system interface chip 204 (e.g. "regular circuit and it's digital logic" portion of the system interface chip 204). Also, the battery's 207 separate ground is isolated from the system ground, which now has VBAT on it. The watchdog circuit 202 is then powered by Cext 206 (22 uF).

In one example embodiment, the "regular circuit and it's digital logic" in the system interface chip 204 performs a "data transfer" function between the second apparatus 200 (e.g. cell phone) and a connected USB device (not shown).

The "watchdog circuit (e.g. timer and digital control circuit) in this implementation is a counter which performs some role in the cell phone. In one example embodiment, the watchdog timer 218 receives a "keep-alive" signal (not shown) from elsewhere in the second apparatus 200 (e.g. elsewhere in the cell phone's circuitry) when there is not a fault condition.

Upon determining that the apparatus 200 needs to be reset, the watchdog timer 218 also receives a "reset" signal (not shown) from elsewhere in the second apparatus 200 circuitry to keep the AUX_GND 214 and GND 216 separate until the second apparatus 200 (e.g. the cell phone) is properly Reset.

Figure 3:
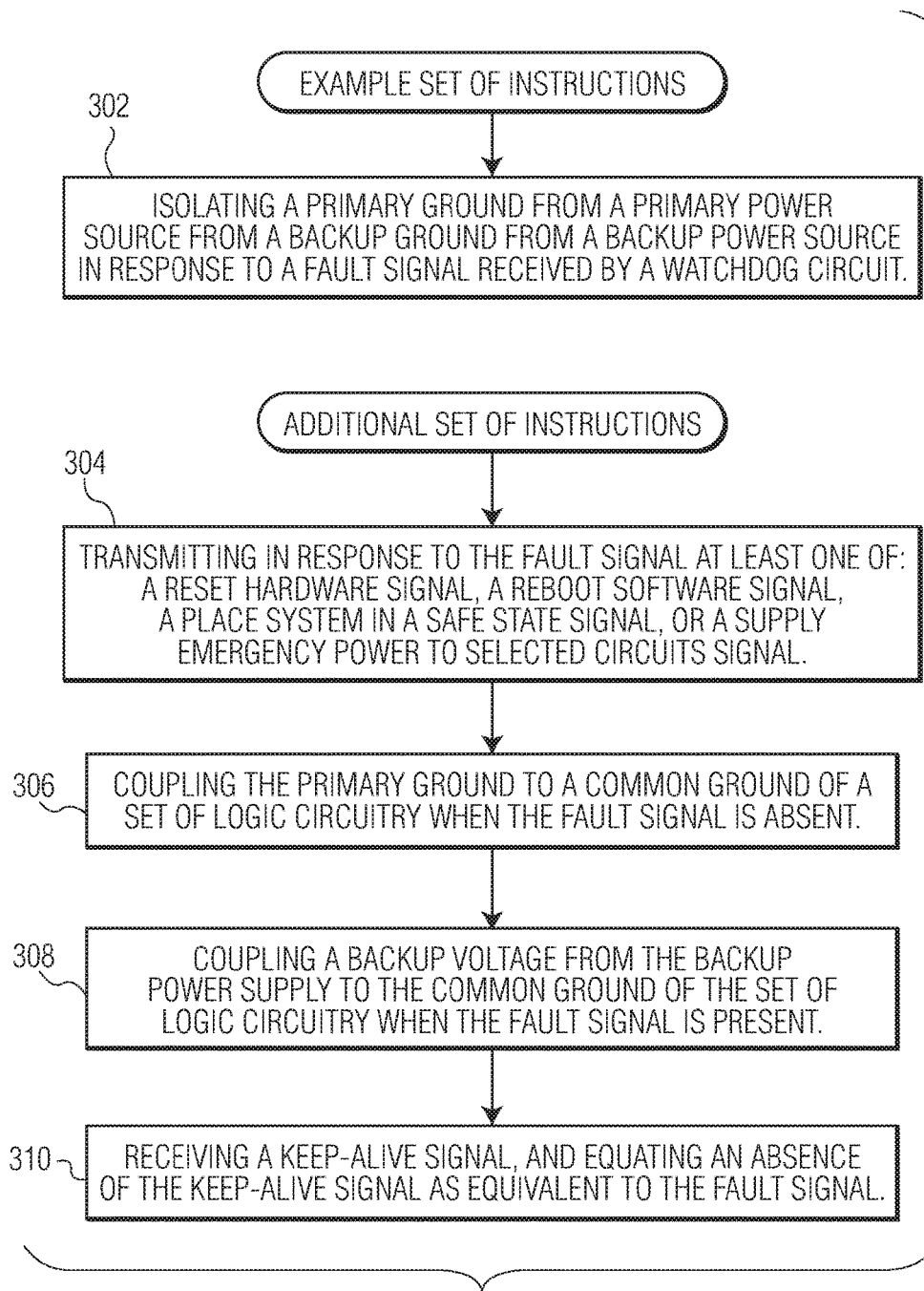
FIG. 3 is an example set of instructions for enabling a watchdog circuit apparatus.

FIG. 3 is an example set of instructions 300 for enabling a watchdog circuit apparatus. The order in which the instructions are discussed does not limit the order in which other example embodiments implement the instructions unless otherwise specifically stated. Additionally, in some embodiments the instructions are implemented concurrently.

A first example instruction set begins in 302, by isolating a primary ground from a primary power source from a backup ground from a backup power source in response to a fault signal received by a watchdog circuit.

The instructions can be augmented or replaced with one or more of the following additional instructions, presented in no particular order: 304—Transmitting in response to the fault signal at least one of: a reset hardware signal, a reboot software signal, a place system in a safe state signal, or a supply emergency power to selected circuits signal. 306—Coupling the primary ground to a common ground of a set of logic circuitry when the fault signal is absent. 308—Coupling a backup voltage from the backup power supply to the common ground of the set of logic circuitry when the fault signal is present. 310—Receiving a keep-alive signal, and equating an absence of the keep-alive signal as equivalent to the fault signal.

Figure 4:
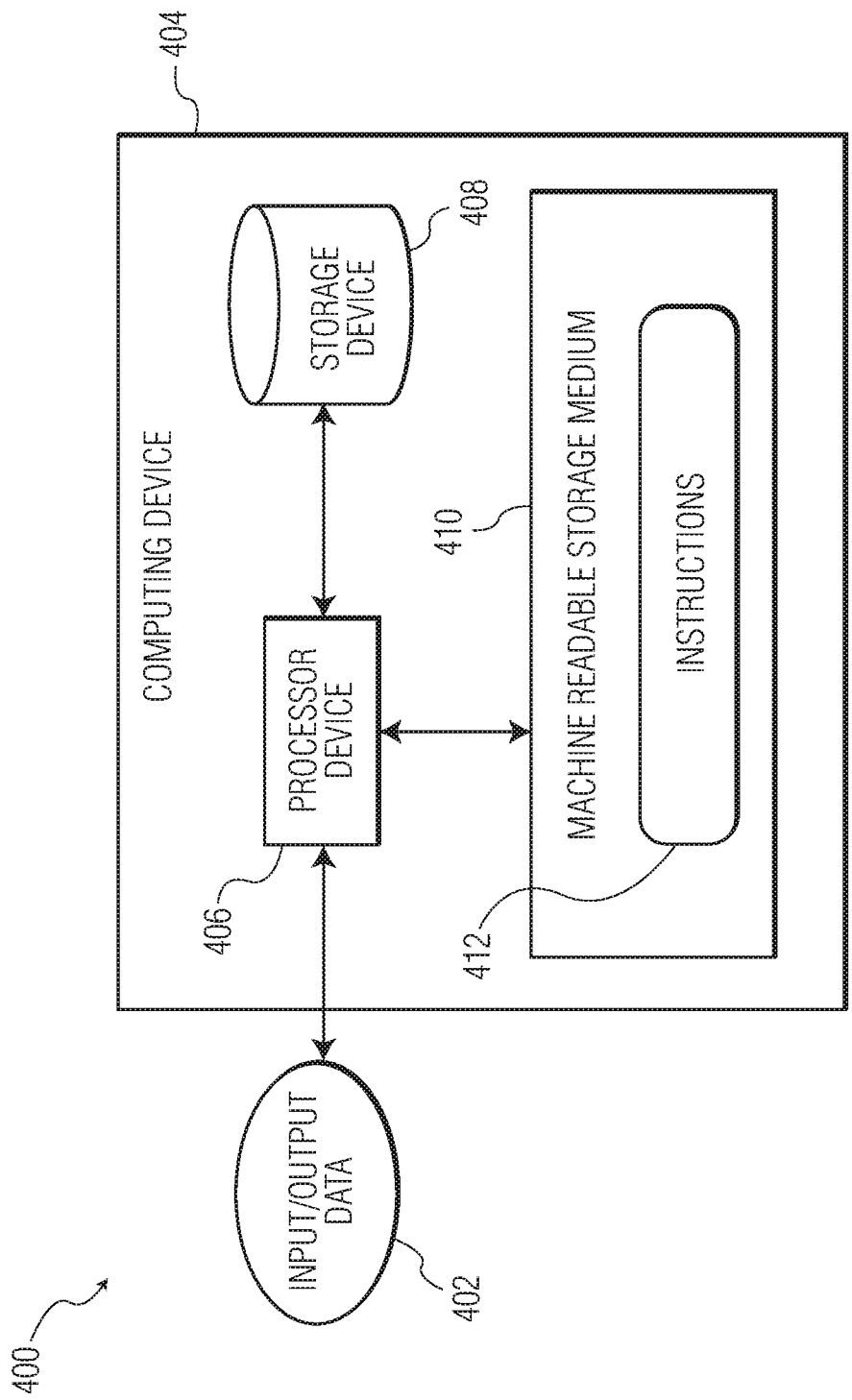
FIG. 4 is an example system for hosting instructions for enabling an watchdog circuit apparatus.

FIG. 4 is an example system 400 for hosting instructions for enabling an watchdog circuit apparatus. The system 400 shows an input/output data 402 interface with an electronic apparatus 404. The electronic apparatus 404 includes a processor 406, a storage device 408, and a non-transient machine-readable storage medium 410. The machine-readable storage medium 410 includes instructions 412 which control how the processor 406 receives input data 402 and transforms the input data into output data 402, using data within the storage device 408. Example instructions 412 stored in the machine-readable storage medium 410 are discussed elsewhere in this specification. The machine-readable storage medium in an alternate example embodiment is a non-transient computer-readable storage medium.

The processor (such as a central processing unit, CPU, microprocessor, application-specific integrated circuit (ASIC), etc.) controls the overall operation of the storage device (such as random access memory (RAM) for temporary data storage, read only memory (ROM) for permanent data storage, firmware, flash memory, external and internal hard-disk drives, and the like). The processor device communicates with the storage device and non-transient machine-readable storage medium using a bus and performs operations and tasks that implement one or more instructions stored in the machine-readable storage medium. The machine-readable storage medium in an alternate example embodiment is a computer-readable storage medium.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. A watchdog circuit:
   wherein the watchdog circuit is configured to receive a primary ground from a primary power supply, and a backup ground from a backup power supply;
   wherein the watchdog circuit includes a ground switch coupled to the primary ground and the backup ground; and wherein the ground switch is configured to isolate the primary ground from the backup ground in response to a fault signal.

2. The circuit of claim 1:
wherein, in response to the fault signal, the ground switch is powered by the backup power supply and not the primary power supply.

3. The circuit of claim 1:
wherein the fault signal is at least one of: a system power outage signal, a circuit malfunction signal, a computer malfunction signal, an error state signal, or a sensor signal.

4. The circuit of claim 1:
wherein the watchdog circuit, in response to the fault signal, is configured to transmit at least one of: a reset hardware signal, a reboot software signal, a place system in a safe state signal, or a supply emergency power to selected circuits signal.

5. The circuit of claim 1:
further comprising a set of logic circuitry having a common ground which is coupled to a reset switch input;
wherein the reset switch input is configured to route the primary ground to the common ground of the set of logic circuitry when the fault signal is absent; and
wherein the reset switch input is configured to route a backup voltage from the backup power supply to the common ground of the set of logic circuitry when the fault signal is present.

6. The circuit of claim 5:
wherein the logic circuitry is configured to operate normally when receiving the primary ground; and
wherein the logic circuitry is configured to reset when receiving the backup voltage.

7. The circuit of claim 5:
further comprising a reset switch, coupled to the reset switch input and the watchdog circuit;
wherein the watchdog circuit is configured to generate a reset signal in response to the fault signal;
wherein the reset switch is configured to receive the reset signal and couple the primary ground to the logic circuitry when the reset signal is absent; and
wherein the reset switch is configured to couple the backup voltage to the logic circuitry when the reset signal is present.

8. The circuit of claim 1:
wherein the backup power supply is at least one of: a charge storage device, a storage capacitor, or a battery.

9. The circuit of claim 1:
wherein the watchdog circuit is configured to receive a keep-alive signal; and
wherein the watchdog circuit is configured to equate absence of the keep-alive signal as equivalent to the fault signal.

10. The circuit of claim 9:
wherein the watchdog circuit includes a timer;
wherein the timer is configured to determine a time since a last keep-alive signal was received; and
wherein the watchdog circuit is configured to equate absence of the keep-alive signal as equivalent to the fault signal, when the time since the last keep-alive signal was received exceeds a preset threshold time.

11. The circuit of claim 1:
wherein the watchdog circuit is embedded within a system interface chip configured to transfer data received from a USB interface to internal circuits within an electronic device.

12. The circuit of claim 1:
wherein the watchdog circuit is embedded in at least one of: a cell phone, a smartphone, a wearable, an internet of things device, a microcontroller, an automotive system controller, or a vehicle to vehicle interface device.

13. An article of manufacture including at least one non-transitory, tangible machine readable storage medium containing executable machine instructions for operating a watchdog circuit, comprising:
wherein the article includes a ground switch coupled to a primary ground from a primary power supply, and a backup ground from a backup power supply; and
wherein the instructions include isolating the primary ground from the backup ground in response to a fault signal.

14. The article of claim 13, wherein the instructions include:
transmitting in response to the fault signal at least one of: a reset hardware signal, a reboot software signal, a place system in a safe state signal, or a supply emergency power to selected circuits signal.

15. The article of claim 13,
wherein the article includes a set of logic circuitry having a common ground; and
wherein the instructions includes:
coupling the primary ground to the common ground of the set of logic circuitry when the fault signal is absent; and
coupling a backup voltage from the backup power supply to the common ground of the set of logic circuitry when the fault signal is present.

16. The article of claim 13, wherein the instructions include:
receiving a keep-alive signal; and
equating an absence of the keep-alive signal as equivalent to the fault signal.

17. A watchdog circuit:
wherein the watchdog circuit is configured to receive a primary ground from a primary power supply, and a backup ground from a backup power supply;
wherein the watchdog circuit includes a ground switch coupled to the primary ground and the backup ground;
wherein the ground switch is configured to isolate the primary ground from the backup ground in response to a fault signal; and
wherein the backup power supply is at least one of: a charge storage device, a storage capacitor, or a battery.

* * * * *